(12) United States Patent
Yiannacouras et al.

(10) Patent No.: US 9,703,696 B1
(45) Date of Patent: Jul. 11, 2017

(54) GUIDED MEMORY BUFFER ALLOCATION

(71) Applicant: ALTERA CORPORATION, San Jose, CA (US)

(72) Inventors: Peter Yiannacouras, Etobicoke (CA); Deshanand Singh, Toronto (CA); John Freeman, Toronto (CA)

(73) Assignee: Altera Corporation, San Jose, CA (US)

( * ) Notice: Subject to any disclaimer, the term of this patent is extended or adjusted under 35 U.S.C. 154(b) by 191 days.

(21) Appl. No.: 14/024,429

(22) Filed: Sep. 11, 2013

(51) Int. Cl.
*G06F 17/50* (2006.01)
*G06F 12/02* (2006.01)

(52) U.S. Cl.
CPC .................. *G06F 12/023* (2013.01)

(58) Field of Classification Search
CPC ............... G06F 17/5068; G06F 17/505; G06F 17/5054; G06F 17/5077
See application file for complete search history.

(56) References Cited

U.S. PATENT DOCUMENTS

| | | | | |
|---|---|---|---|---|
| 5,924,111 | A * | 7/1999 | Huang et al. | 711/5 |
| 8,839,184 | B1 * | 9/2014 | Seguine et al. | 716/139 |
| 2011/0119322 | A1 * | 5/2011 | Li | G06F 15/7842 709/201 |
| 2011/0285729 | A1 * | 11/2011 | Munshi | G06F 9/5044 345/536 |
| 2012/0291040 | A1 * | 11/2012 | Breternitz et al. | 718/104 |
| 2013/0116984 | A1 * | 5/2013 | Montana | G06T 17/00 703/1 |
| 2013/0212315 | A1 * | 8/2013 | Steiner et al. | 711/103 |
| 2014/0075060 | A1 * | 3/2014 | Sharp | G06T 1/60 710/57 |
| 2014/0123101 | A1 * | 5/2014 | Kim | G06F 8/71 717/101 |

* cited by examiner

*Primary Examiner* — Ryan Bertram
*Assistant Examiner* — Trang Ta
(74) *Attorney, Agent, or Firm* — Fletcher Yoder, P.C.

(57) ABSTRACT

Systems and methods for explicit organization of memory allocation on an integrated circuit (IC) are provided. In particular, a programmable logic designer may incorporate specific mapping requests into programmable logic designs. The mapping requests may specify particular mappings between one or more data blocks (e.g., memory buffers) of a host program to one or more physical memory banks.

18 Claims, 4 Drawing Sheets

GUIDED MEMORY BUFFER ALLOCATION

BACKGROUND

The present disclosure relates generally to integrated circuits, such as field programmable gate arrays (FPGAs). More particularly, the present disclosure relates to host program guided memory allocation on integrated circuits (e.g., an FPGA).

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Integrated circuits (ICs) take a variety of forms. For instance, field programmable gate arrays (FPGAs) are integrated circuits that are intended as relatively general-purpose devices. FPGAs may include logic that may be programmed (e.g., configured) after manufacturing to provide any desired functionality that the FPGA is designed to support. Thus, FPGAs contain programmable logic, or logic blocks, that may be configured to perform a variety of functions on the FPGAs, according to a designer's design. Additionally, FPGAs may include input/output (I/O) logic, as well as high-speed communication circuitry. For instance, the high-speed communication circuitry may support various communication protocols and may include high-speed transceiver channels through which the FPGA may transmit serial data to and/or receive serial data from circuitry that is external to the FPGA. For example, certain programming languages, such as OpenCL, may enable hosting of programmable logic off the IC, enabling functionalities of the IC to be controlled, or at least impacted, by an external host.

In ICs such as FPGAs, the programmable logic is typically configured using low level programming languages such as VHDL or Verilog. Unfortunately, these low level programming languages may provide a low level of abstraction and, thus, may provide a development barrier for programmable logic designers. Higher level programming languages, such as OpenCL have become useful for enabling more ease in programmable logic design. The higher level programs are used to generate code corresponding to the low level programming languages. Kernels may be useful to bridge the low level programming languages into executable instructions that may be performed by the integrated circuits. Accordingly, OpenCL programs typically utilize at least a single hardware implementation for each kernel in the OpenCL program. Unfortunately, as these programs become more complex and/or sophisticated, the performance of the implementation on the integrated circuit may be negatively impacted. For example, global memory bandwidth may oftentimes be a limiting factor in the performance of an OpenCL application.

Boards that implement OpenCL hardware platforms often use multiple dual in-line memory modules (DIMMs) or banks of memories to implement high-bandwidth external memory systems. The bandwidth performance is directly dependent on a kernel's specific memory access pattern and the organization of data across the banks. Unfortunately, in traditional systems, the programmable logic design has very little control over the memory access pattern or the organization of the data across the banks. Accordingly, a system that enables enhanced guidance of memory allocation by a programmable logic design is desired.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments relate to systems, methods, and devices for allocating data blocks (e.g., programmable logic memory buffers) to specific physical memory banks based upon guidance from the designer of the programmable logic. In particular, the present embodiments may allocate OpenCL host program memory buffers to specific physical memory banks based upon the programmable logic designer's guidance.

Various refinements of the features noted above may be made in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present invention alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed in further detail below, embodiments of the present disclosure relate generally to circuitry for enhancing performance of machine-readable programs implemented on an integrated circuit (IC). In particular, explicit allocation of logical memory to physical memory areas may be used to enhance performance of a machine-implemented program executed on the IC. These modifications may be made based upon performance metrics or other characteristics of the machine-readable program.

Figure 1:
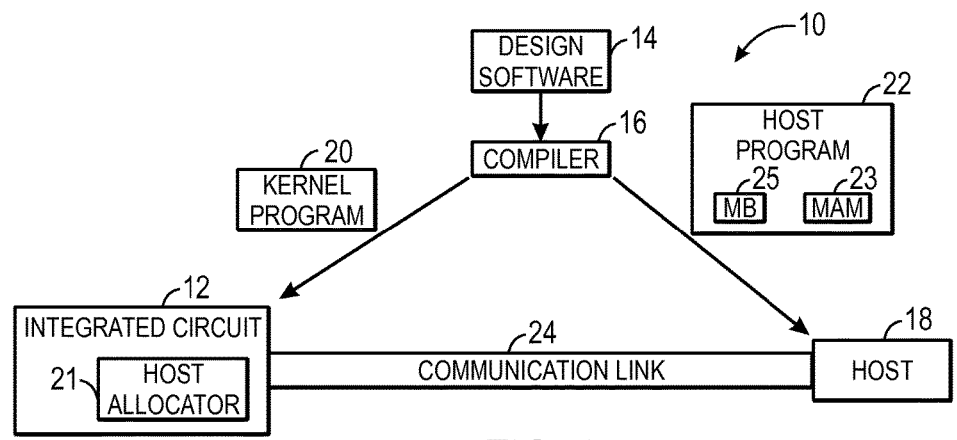
FIG. 1 is a block diagram of a system that utilizes memory allocation guidance logic to affect memory allocation of a machine-implemented program, in accordance with an embodiment.

With the foregoing in mind, FIG. 1 illustrates a block diagram of a system 10 that utilizes adaptable logic to affect a machine-implemented program. As discussed above, a designer may desire to implement functionality on an integrated circuit 12 (IC, such as a field programmable gate array (FPGA)). The designer may specify a high level program to be implemented, such as an OpenCL program, which may enable the designer to more efficiently and easily provide programming instructions to implement a set of programmable logic for the IC 12 without requiring specific knowledge of low level computer programming languages (e.g., Verilog or VHDL). For example, because OpenCL is quite similar to other high level programming languages, such as C++, designers of programmable logic familiar with such programming languages may have a reduced learning curve than designers that are required to learn unfamiliar low level programming languages to implement new functionalities in the IC.

The designers may implement their high level designs using design software 14, such as a version of Quartus by Altera™. For example, as will be discussed in more detail below, the high level designs or programs may include explicit indications of particular physical memory areas to be utilized by portions of the program. The design software 14 may use a compiler 16 to convert the high level program into a low level program. The compiler 16 may provide machine-readable instructions representative of the high level program to a host 18 and the IC 12. For example, the IC 12 may receive one or more kernel programs 20 which describe the hardware implementations that should be stored in the IC 12. The IC 12 and/or the compiler 16 may include a host allocator 21, which, as will be discussed in more detail below, may provide kernel-to-device memory allocation operations. The kernel-to-device memory allocation operations may be used to convert logical memory accesses to physical memory access between the kernel 20 and the IC 12.

The host 18 may receive a host program 22, which may be implemented by the kernel programs 20. The host program 22 may incorporate host-to-device memory allocation operations useful for memory organization between the host 18 and the IC 12. For example, as will be discussed in more detail below, the host program 22 may include a particular memory allocation or mapping 23, which may define particular physical memory location allocations for particular portions of the host program 22. To implement the host program 22, the host 18 may communicate instructions from the host program 22 to the IC 12 via a communications link 24, which may be, for example, direct memory access (DMA) communications or peripheral component interconnect express (PCIe) communications. In some embodiments, the kernel-to-device memory allocation operations may be used in conjunction with the host-to-device memory allocation operations to enable explicit logical to physical memory mappings, as defined by a programmable logic designer. Accordingly, control of the programmable logic design may be more tightly controlled by the programmable logic designer.

Figure 2:
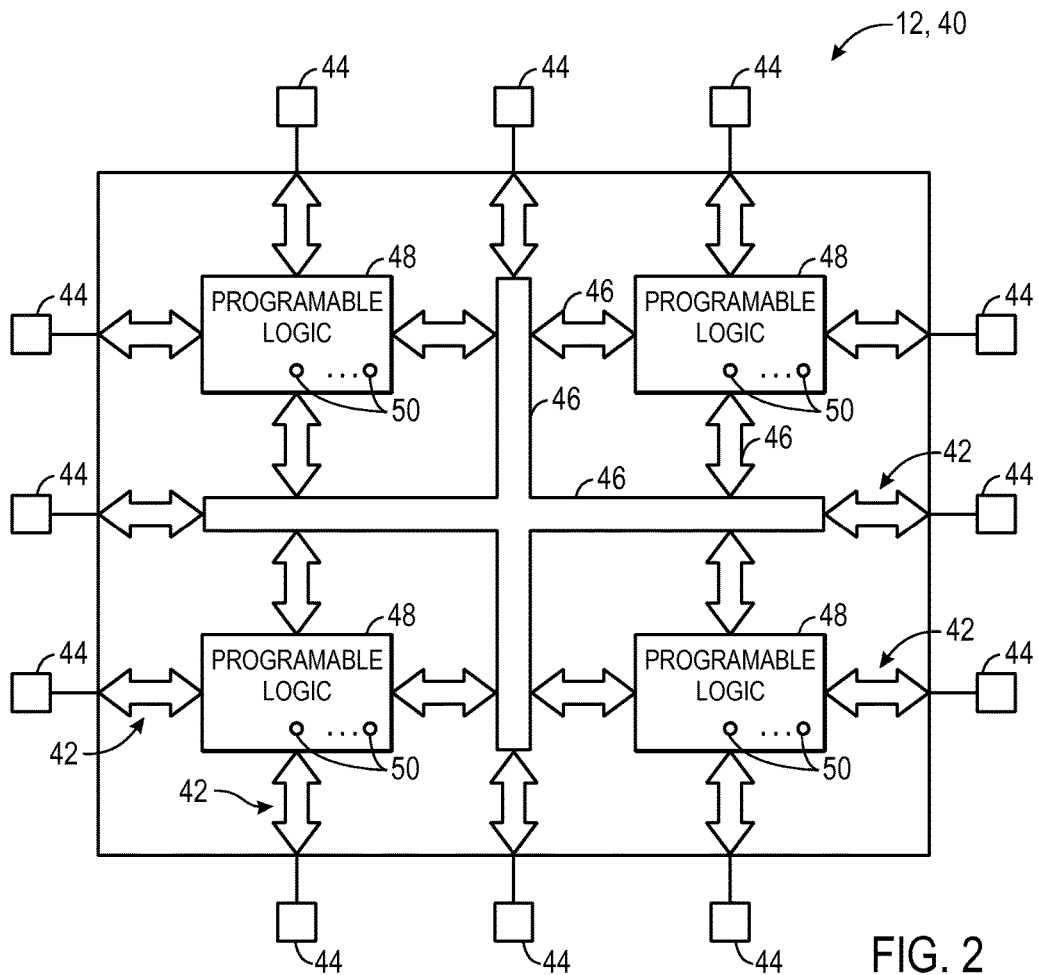
FIG. 2 is a block diagram of a programmable logic device that may make use of memory allocation guidance logic, in accordance with an embodiment.

Turning now to a more detailed discussion of the IC 12, FIG. 2 illustrates an IC device 12, which may be a programmable logic device, such as a field programmable gate array (FPGA) 40. For the purposes of this example, the device 40 is referred to as an FPGA, though it should be understood that the device may be any type of programmable logic device (e.g., an application-specific integrated circuit and/or application-specific standard product). As shown, FPGA 40 may have input/output circuitry 42 for driving signals off of device 40 and for receiving signals from other devices via input/output pins 44. Interconnection resources 46, such as global and local vertical and horizontal conductive lines and buses, may be used to route signals on device 40. Additionally, interconnection resources 46 may include fixed interconnects (conductive lines) and programmable interconnects (i.e., programmable connections between respective fixed interconnects). Programmable logic 48 may include combinational and sequential logic circuitry. For example, programmable logic 48 may include look-up tables, registers, and multiplexers. In various embodiments, the programmable logic 48 may be configured to perform a custom logic function. The programmable interconnects associated with interconnection resources may be considered to be a part of programmable logic 48. As discussed in further detail below, the FPGA 40 may include memory allocation logic, such that the OpenCL global memory address space may be organized as separately addressable memories, wherein memory buffers 25 of the programmable logic 48 may be explicitly allocated to one or more of the separately addressable memories (e.g., based upon a programmable logic designer's allocation request and/or a compiler request).

Programmable logic devices (PLDs), such as FPGA 40, may contain programmable elements 50 with the programmable logic 48. For example, as discussed above, a designer (e.g., a customer) may program (e.g., configure) the programmable logic 48 to perform one or more desired functions. By way of example, some programmable logic devices may be programmed by configuring their programmable elements 50 using mask programming arrangements, which is performed during semiconductor manufacturing. Other programmable logic devices are configured after semiconductor fabrication operations have been completed, such as by using electrical programming or laser programming to program their programmable elements 50. In general, programmable elements 50 may be based on any suitable programmable technology, such as fuses, antifuses, electrically-programmable read-only-memory technology, random-access memory cells, mask-programmed elements, and so forth.

The PLDs may be electrically programmed. With electrical programming arrangements, the programmable elements 50 may be formed from one or more memory cells. For example, during programming, configuration data is loaded into the memory cells 50 using pins 44 and input/output circuitry 42. In one embodiment, the memory cells 50 may be implemented as random-access-memory (RAM) cells.

The use of memory cells 50 based on RAM technology described herein is intended to be only one example. Further, because these RAM cells are loaded with configuration data during programming, they are sometimes referred to as configuration RAM cells (CRAM). These memory cells 50 may each provide a corresponding static control output signal that controls the state of an associated logic component in programmable logic 48. For instance, in some embodiments, the output signals may be applied to the gates of metal-oxide-semiconductor (MOS) transistors within the programmable logic 48.

The circuitry of FPGA 40 may be organized using any suitable architecture. As an example, the logic of FPGA 40 may be organized in a series of rows and columns of larger programmable logic regions, each of which may contain multiple smaller logic regions. The logic resources of FPGA 40 may be interconnected by interconnection resources 46 such as associated vertical and horizontal conductors. For example, in some embodiments, these conductors may include global conductive lines that span substantially all of FPGA 40, fractional lines such as half-lines or quarter lines that span part of device 40, staggered lines of a particular length (e.g., sufficient to interconnect several logic areas), smaller local lines, or any other suitable interconnection resource arrangement. Moreover, in further embodiments, the logic of FPGA 40 may be arranged in more levels or layers in which multiple large regions are interconnected to form still larger portions of logic. Still further, other device arrangements may use logic that is not arranged in a manner other than rows and columns.

As discussed above, the FPGA 40 may allow a designer to create a customized design capable of executing and performing customized functionalities. Each design may have its own hardware implementation to be implemented on the FPGA 40. For instance, a single hardware implementation may be used for each kernel in a design for the FPGA 40. In some instances, it may be desirable to enhance performance of the program by allowing the compiler 16 and/or programmable logic designer to explicitly allocate memory buffers (e.g., memory buffers 25 of FIG. 1) of programmable logic (e.g., host program 22) to particular physical memories (e.g., the programmable elements 50 and/or particular onboard banks of memory). Thus, during execution of the host program (e.g., host program 22), data access may be more uniformly distributed across each of the multiple banks of memories (e.g., programmable elements 50) of the system. This is described in more detail below.

Figure 3:
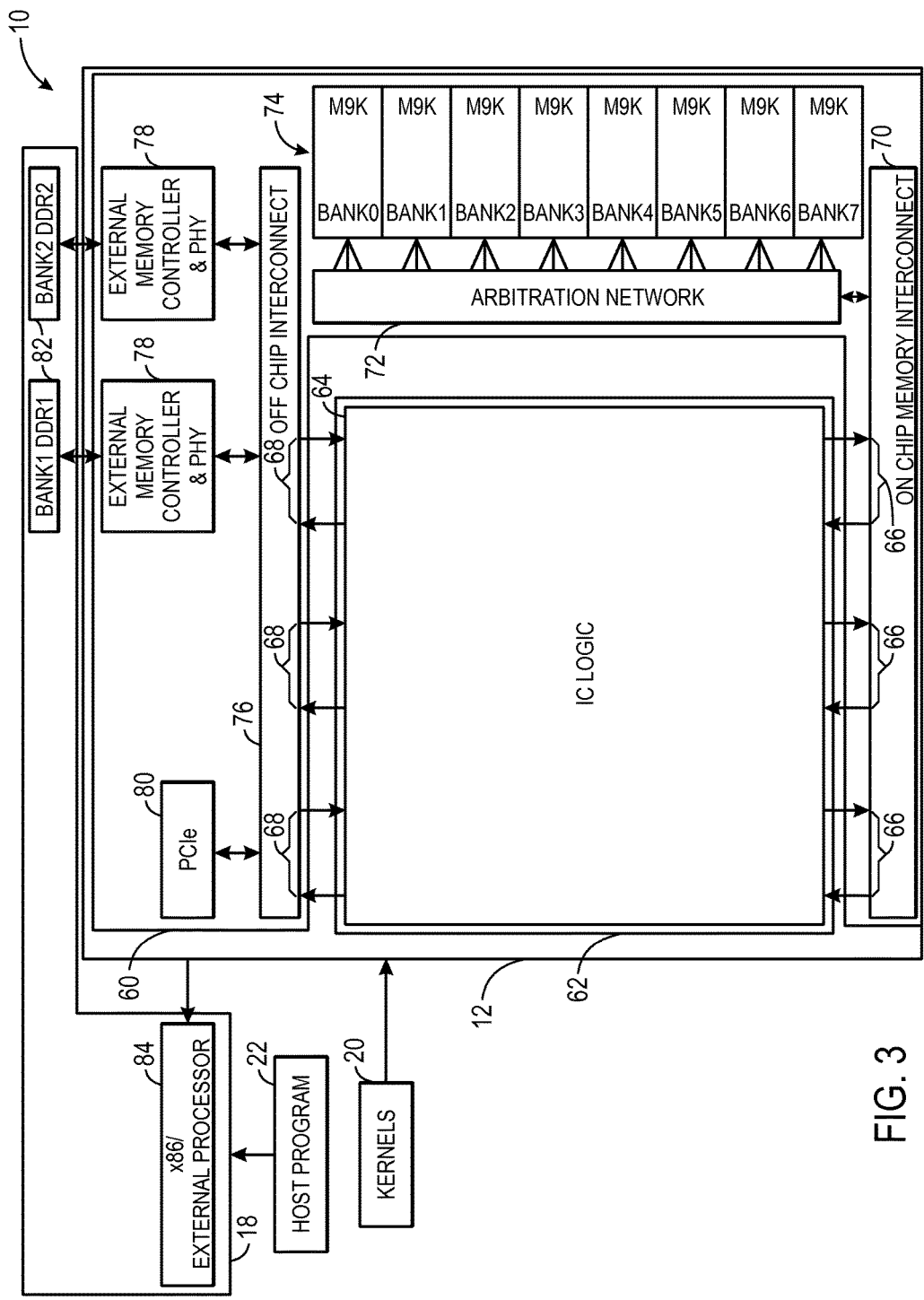
FIG. 3 is a block diagram illustrating elements of the host and integrated circuit of FIG. 1, in accordance with an embodiment.

Referring now to FIG. 3, a block diagram illustrating the system 10, further detailing elements of the host 18 and IC 12 of FIG. 1 is provided. As illustrated, the IC 12 may include fixed components 60 and configurable components 62. For example, in some embodiments, the configurable components may include IC logic blocks 64 stored on an IC 12 (such as FPGA 40 of FIG. 2). The IC logic blocks 64 may provide an ability to add customizable logic to the IC 12. The IC logic blocks 64 may include one or more ports to both on-chip memory interconnects and off-chip interconnects (ports 66 and 68, respectively). The IC logic blocks 64 are not restricted to a particular protocol; however, each of the IC logic blocks 64 within an IC 12 may agree on a common protocol. For example, each of the IC blocks 64 may use the Avalon® Memory-Mapped (Avalon-MM) interface, which may allow easy interconnection between components in the IC 12.

Turning now to a discussion of the fixed logic 60, the fixed logic 60 may include an on-chip memory interconnect 70, an arbitration network 72, local memory 74, an off-chip interconnect 76, external memory and physical layer controllers 78, and/or a PCIe bus 80. The on-chip memory interconnect 70 may connect to the IC logic blocks 64 over the on-chip memory interconnect ports 66 of the IC logic blocks 64. The on-chip memory interconnect 70 may facilitate access between the IC logic blocks 64 and the local memory 74 via the arbitration network 72. Further, the off-chip memory interconnect 76 may connect to the IC logic blocks 64 over the off-chip memory interconnect ports 68 of the IC logic blocks 64. The off-chip interconnect 76 may facilitate communications between the IC logic blocks 64 and the host communications components (e.g., the external memory and physical layer controllers 78 and the PCIe bus 80). The external memory and physical layer controllers 78 may facilitate access between the IC 12 and external memory (e.g., memory 82 of the host 18). Further, the PCIe bus 80 may facilitate communication between the IC 12 and an external processor (e.g., processor 84 of the host 18). As will become more apparent, based on the discussion that follows, coordination of memory allocation between the kernels 20 and/or the host program 22 may be useful to enable explicit allocation of memory requests in the host program 22 to particular combination of host device memory banks 82 (e.g., at least one of "banks 1 and 2") and/or a particular combination of onboard memory 74 (e.g., at least one of "banks 1-7").

Figure 4:
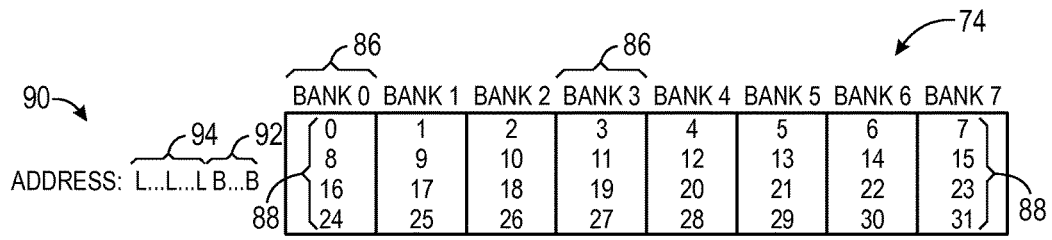
FIG. 4 is an illustration of a fine interleaving memory organization scheme, in accordance with an embodiment.
Figure 5:
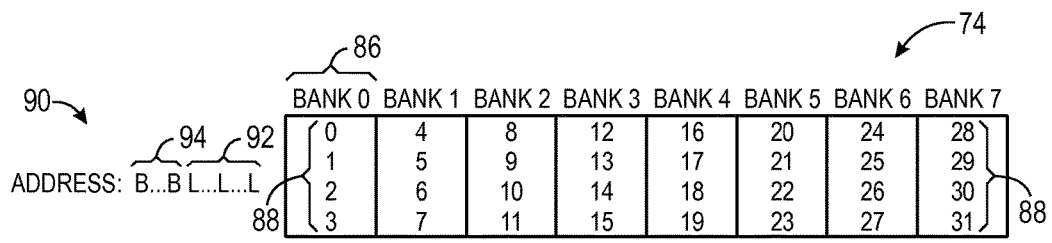
FIG. 5 is an illustration of a coarse interleaving memory organization scheme, in accordance with an embodiment.

The organization of the memory 74 may play a role in enabling the explicit memory allocation described herein. Many different organization methods may be used. FIG. 4 illustrates a fine interleaving method of memory organization and FIG. 5 illustrates a coarse interleaving method of memory organization. In the example provided in FIG. 4, a physical memory (e.g. onboard memory 74) made of B memory banks 86 (e.g., 8), each with N memory words 88 (e.g. 4) can be organized such that some of the least significant bits 92 in the memory address 90 differentiate between the different banks 86, while the most significant bits 94 indicate a location within the different banks 86. Using the least significant bits 92 of the word address 90 to differentiate between the banks 86 results in an organization where every successive word 88 alternates memory banks 86 with which it is bound. For example, word 0 is in "bank 0" and the next successive word 88, "word 1," is in "bank 1." Accordingly, using the notation bank$_i$:<address within bank>, address 90 of FIG. 4 is translated to bank$_{A \% B}$:A/B, where the % operator computes the remainder of the division of B into A. Fine interleaving may be useful to more efficiently access data across multiple banks 86. For example, memory words 88 that are sequential, such as words 0, 1, 2, and 3 may be accessed in parallel, due to being stored in separate banks 86. This may enable more efficient memory access.

Alternatively, coarse interleaving may be used to organize the memory, as illustrated in FIG. 5. In a coarse interleaving method, the most significant bits 94 of the address may be used to obtain the bank address bank$_{A/N}$:A % N. In this case, each physical bank 86 is associated with its own contiguous range of logical addresses which allows a programmable logic designer to place (e.g., bind) whole memory buffers 25 entirely within one bank 86 (or a subset of banks 86 when overflow occurs). For example, in FIG. 5, "bank 0" contains successive memory words 88, words 0-3. Accordingly, this coarse interleaving organizational case is highly effective for enabling programmable logic designers to explicitly control the allocation of memory buffers 25 in their designs by creating large blocks of memory (e.g., IC logic blocks 64 or "pages" of memory) where whole memory buffers 25 (or large portions of memory buffers 25) may be stored. Accordingly, embodiments of the current technique, may utilize memory architectures where higher order address bits 94 identify the physical bank 86, while using the least significant bits 92 to describe locations within the bank 86.

Figure 6:
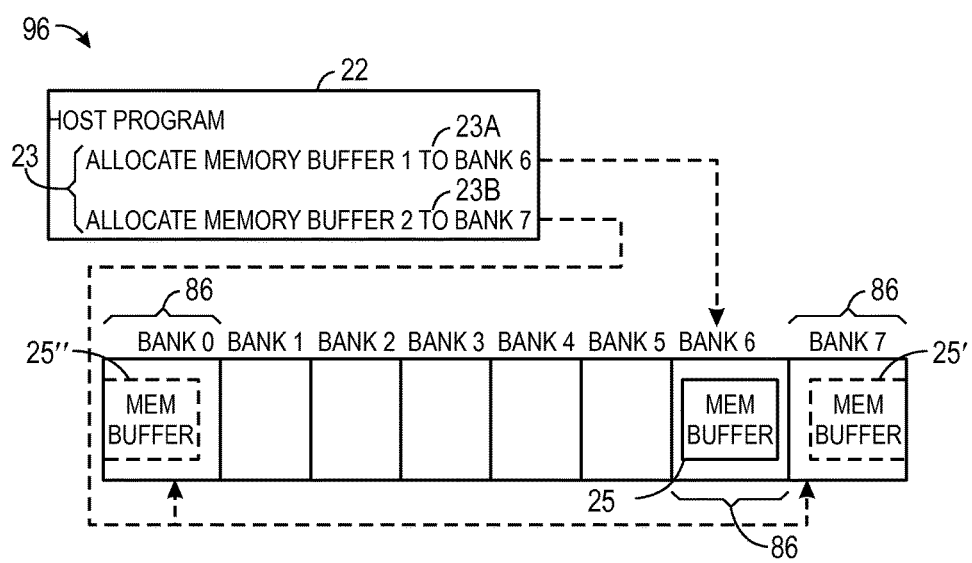
FIG. 6 is an example of memory allocation using the coarse interleaving memory organization scheme of FIG. 5.

FIG. 6 illustrates an example of a memory allocation 96 using mappings 23 provided in a host program 22. By utilizing the coarse interleaving method described in FIG. 5, whole memory buffers 25 may be placed in a particular bank 86. Accordingly, the coarse interleaving method enables fulfillment of the mapping 23A, which requests that a logical memory buffer 25 named "memory buffer 1" be placed in "bank 6." Thus, as illustrated, the entire memory buffer 25 named "memory buffer 1" is placed in "bank 6."

Despite coarse interleaving, under certain circumstances, an entire memory buffer 25 cannot be placed in a requested memory bank 86. For example, while mapping 23B provides a request to place a memory buffer 25 named "memory buffer 2" in "bank 7," the request may not be fulfilled (e.g., because there is not enough physical memory in "bank 7" to store "memory buffer 2"). Accordingly, in some embodiments, the mapping 23B may be fulfilled by striding the memory buffer 25 across multiple banks, starting with the requested bank 86 and placing the remaining portion of the buffer 25 in one or more additional banks 86. For example, the placement of "memory buffer 2" may begin by placing a portion 25' of "memory buffer 2" in "bank 7" and placing the remaining portion 25" in "bank 0." Accordingly, in this embodiment, the mapping 23B may be fulfilled to the extent possible.

As illustrated above, both fine interleaving and coarse interleaving have advantages. Data may be accessed in parallel across the memory banks 86. Accordingly, performance may be enhanced by spreading the data across the memory banks 86. Fine interleaving may provide more efficient memory access by finely spreading data across memory banks 86. Further, coarse interleaving may enable larger blocks of data to be stored in a specific bank 86, thus enabling the larger blocks to be accessed in parallel. Accordingly, in some cases, performance may be enhanced by spreading the data finely across the banks 86. In other cases, the performance (e.g., data accesses) may be enhanced by spreading the data coarsely across the memory banks 86. In some embodiments, it may be useful to switch between higher order and lower order address bits defining the physical banks 86. Thus, using the lower order address bits 92 to define a bank 86 (e.g., as shown in FIG. 4) provides fine interleaving of the memory, which may improve the speed of access to the memory. However, using the higher order address bits 94 to define a bank 86 (e.g., as shown in FIG. 5) may enable separately addressable physical memory locations, which is useful when memory is explicitly allocated in the host program 22. Accordingly, the memory organization may be dynamically configured to enable a coarse interleaving organization when the host program 22 is loaded and an explicit allocation of memory is found. Otherwise, the fine interleaving organization may be used. The dynamic organization may be chosen based on, for example, a programmable logic designer's input, and/or an analysis of the kernel(s) and workload to run.

As will be discussed in more detail below, a host memory allocation hardware module (e.g., host allocator 21) may permute a first memory addressing and perform proper transaction conversions resulting in the explicit allocation requested in the host program (e.g., host program 22). As discussed above, converting logical memory addresses (e.g., addresses of the memory buffers 25) to physical memory addresses (e.g., addresses in the onboard memory 74) may be done via host-to-device-memory operations and/or kernel-to-device-memory operations. To ensure the memory allocation is permuted prior to any memory accesses, the permutation may be performed upon creation of the OpenCL platform, device, or context as appropriate. Alternatively, the permutation may occur during creation or invocation of the kernel 20 if: (i) the host 18 memory operations are staged such that operations take affect after the desired dynamic memory organization is known; or (ii) upon detecting a change in memory organization, the existing memory buffers 25 from the device are read back before reallocating, and then performing the reallocation, and subsequently writing the data back into the new memory organization.

Figure 7:
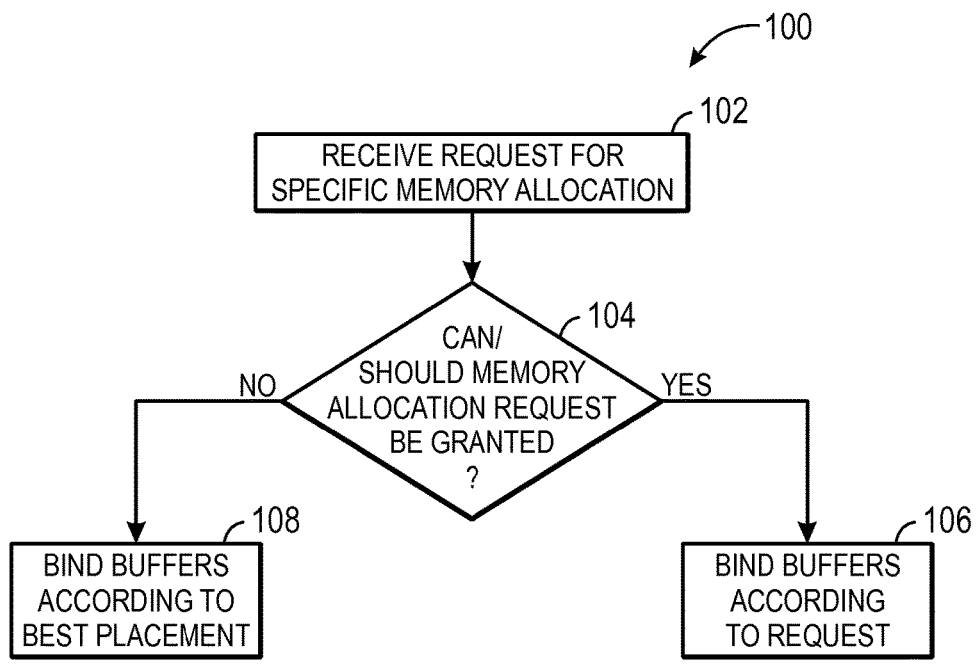
FIG. 7 is a process for explicitly allocating logical memory to one or more particular physical memory areas, in accordance with an embodiment.

FIG. 7 illustrates a process 100 for explicitly allocating logical memory to one or more particular physical memory areas (e.g. at least one of "banks 1-7" of onboard memory 74 or FIG. 3). The process 100 may be executed via a processor following machine-readable instructions stored on a tangible, non-transitory, machine-readable medium, such as a computer storage device. First, a request for a specific memory allocation is received (block 102). For example, this request may be provided by a programmable logic design in the host program 22. The host program 22 may request that particular memory buffers 25 of the OpenCL device's programmable logic design be allocated to and/or deallocated from particular physical memory areas (e.g., one or more particular banks 86 of the onboard memory 74). For example, as will be illustrated in FIG. 8, a memory buffer allocation request 23 may include one or more compile-time attributes that map a memory buffer (e.g., memory buffer 25) created by the allocation to a specific physical memory bank (e.g., one or more particular banks 86 of the onboard memory 74). In certain embodiments, the programmable logic designer may provide, in a memory buffer allocation request 23, an indication of a suggested memory bank 86 for the allocation. Thus, for each instance of a memory allocation invocation, a memory bank allocation 23 preference may be specified. In a system with N physical banks 86, the indication of a suggested memory bank 86 may be between 1 and N. Further, when no indication is provided or an automatic indication is provided, the best placement may be based on a set of heuristics for selecting where to allocate the memory buffer 25.

Blocks 104-108 of the process 100 illustrate the memory allocation. Based upon the particular request that is received from block 102, a decision is made as to whether the memory allocation request can and/or should be granted (decision block 104). For example, the processor (e.g., a processor of the compiler 16), based upon the instruction, may determine that an allocation cannot or should not be granted based upon space issues with the physical memory banks 86 (e.g., at least one of the banks 86 of onboard memory 74), performance issues with the allocation, or other considerations that make it unfavorable or impossible to complete the allocation. In certain embodiments an error message may be presented to the programmable logic designer, noting that the allocation cannot or should not be granted. In some embodiments, however, the allocation may allocate a memory buffer 25 across a span of multiple banks 86 if desired.

If the allocation can and/or should be granted, the buffers 25 are bound to the physical memory (e.g., onboard memory 74) according to the request (block 106). For example, if the programmable logic designer specifies that a particular memory buffer 25 should be allocated to "bank 2," the allocated memory buffer 25 is bound to "bank 2." If the memory buffer 25 is larger than the space available in "bank 2," a first portion of the memory buffer 25 may be bound to "bank 2" and additional portions may be bound to other memory banks determined to be the best placement, as determined heuristically via the processor and instructions.

Alternatively, if it is determined that the memory allocation 23 request cannot and/or should not be granted, the memory buffers 25 may be bound according to the best allocation determined heuristically via the processor and instructions. For example, the buffer 25 may be placed in a memory bank 86 with the most available free space, in a bank 86 with the closest fit of free space to the memory buffer 25, and/or a memory bank 86 that is accessed less often than other memory banks 86.

Figure 8:
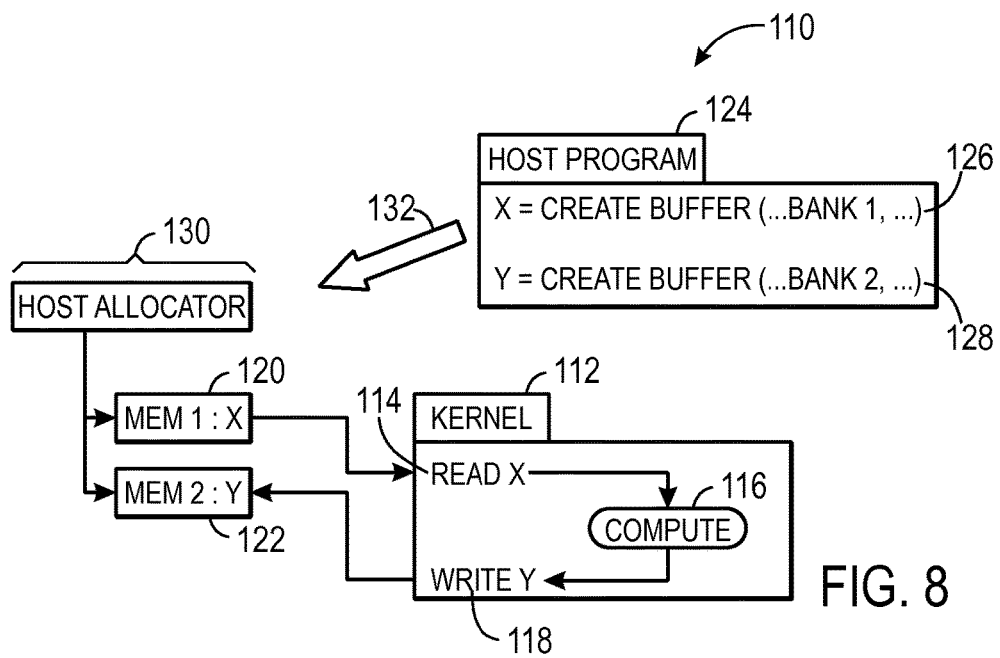
FIG. 8 is an illustration of a sample system with explicit memory allocation, in accordance with an embodiment.

Having now described the memory allocation process, FIG. 8 provides an illustration of a sample system 110 with explicit memory allocation. As illustrated in FIG. 8, an OpenCL kernel 112 may have each thread reading data from one buffer (e.g., read command 114), performing some computation (e.g., computation 116) and then writing the result to another buffer 25 (e.g., via write command 118). In a hardware system with two physical memories (e.g., MEM1 120 and MEM2 122), peak memory bandwidth is achieved if all the data being read is in one memory and all the data being written targets the other memory.

The host program 124 illustrates an embodiment of how an OpenCL programmable logic designer could create OpenCL buffers 25 in their host program 124 which request a specific memory bank 86 for allocation. In the current embodiment, the host program 124 includes commands to allocate one buffer 25 named "X" into "bank 1" (command 126) and another buffer 25 named "Y" into "bank 2" (command 128). The host allocator 130, which may be a processor executing machine-readable instructions stored on a tangible, non-transitory machine-readable medium, receives these memory allocation requests (arrow 132), identifies that it has two physical memories which it can partition data across, and decides to allocate "X" into physical memory 1, and "Y" into physical memory 2, based upon the received allocation requests. Regardless of whether the host allocator 130 grants the allocation requests 126 and 128, the kernel 112 functionality is preserved. However, this particular allocation results in peak memory bandwidth use because the memory accesses are load balanced across the two physical memories, and reads and writes are separated to avoid any potential read-after-write inefficiencies.

By enabling explicit allocation of memory buffers to separately addressable memory spaces, enhanced programmable logic designs may be formed. For example, a programmable logic designer and/or the design software may optimize the programmable logic design for performance by explicitly mapping memory buffers to physical memory banks.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

What is claimed is:

1. A method, comprising:
receiving, via a computer processor, a request for allocating one or more data blocks of a programmable logic design of an integrated circuit to physical memory of the integrated circuit;
when the request comprise an indication of one or more particular physical memory areas of a total set of physical memory areas of the integrated circuit to allocate the one or more data blocks to:
determining, via the computer processor, whether the request can or cannot be granted for allocating the one or more data blocks to the one or more particular physical memory areas; and
when the request can be granted, binding, via the processor, the one or more data blocks to the one or more particular physical memory areas according to the request;
otherwise, when the request does not comprise the indication of the one or more particular physical memory areas of the total set of physical memory areas of the integrated circuit to allocate the one or more data blocks to:
organizing the physical memory in a manner that provides fine interleaving.

2. The method of claim 1, wherein receiving the request comprises receiving the indication from a host program external to the integrated circuit.

3. The method of claim 1, wherein receiving the request comprises receiving the indication as a parameter in a memory buffer creation call of a programmable logic design.

4. The method of claim 1, wherein receiving the request comprises receiving an automatic allocation indication and wherein the method comprises:
determining a best placement of the one or more data blocks in at least a portion of the total set of physical memory areas; and
binding, via the processor, the one or more blocks based upon the best placement when the automatic allocation indication is received.

5. The method of claim 1, comprising:
determining a best placement of the one or more data blocks in at least a portion of the total set of physical memory areas; and
binding, via the processor, the one or more blocks based upon the best placement if the request cannot be granted.

6. The method of claim 1, comprising presenting an error message if the request cannot be granted.

7. The method of claim 1, wherein binding the one or more data blocks to the one or more particular physical memory areas comprises:
mapping the one or more data blocks of the programmable logic design to the one or more particular physical memory areas in a host and in a kernel of an OpenCL implementation.

8. An integrated circuit device comprising:
internal memory;
an off-chip interconnect that provides access between a host computer and the integrated circuit;
an on-chip memory interconnect that provides access to the internal memory of the integrated circuit; and
host allocation circuitry that:
receives a request to allocate one or more memory buffers of an off-chip host program;
when the request comprises an indication to allocate the one or more memory buffers to one or more particular physical memory banks of the internal memory:

determines, via a heuristic algorithm, whether the request should or should not be granted for allocating the one or more memory buffers to the one or more particular physical memory areas; and binds the one or more memory buffers to the one or more particular physical memory banks according to the request when the request should be granted; and when the request does not comprise the indication to allocate the one or more memory buffers to the one or more particular physical memory banks of the internal memory:

organizes the internal memory in a manner that provides fine interleaving.

9. The integrated circuit device of claim 8, wherein the request comprises a request sent by an OpenCL compiler.

10. The integrated circuit device of claim 8, wherein the host allocation circuitry organizes the internal memory in a manner that enables an entire memory buffer in one memory bank.

11. The integrated circuit device of claim 8, wherein the host allocation circuitry dynamically organizes the internal memory by:

determining whether a fine interleaving organization or a reduced interleaving organization should be used; and organizing the internal memory using the least significant bits of a word address to differentiate between memory banks of the internal memory when the fine interleaving organization should be used, or organizing the internal memory using the most significant bits of a word address to differentiate between memory banks of the internal memory when the reduced interleaving organization should be used.

12. The integrated circuit device of claim 11, wherein determining whether a fine interleaving organization or a reduced interleaving organization should be used comprises basing the organization on:

an analysis of a kernel of the off-chip host program to determine whether the fine interleaving organization or the reduced interleaving organization should be used;

an analysis of a workload of the off-chip host program to determine whether the fine interleaving organization or the reduced interleaving organization should be used; or a determination of whether a programmable logic design has provided an indication of whether the fine interleaving organization or the reduced interleaving organization should be used; or any combination thereof.

13. The integrated circuit device of claim 11, wherein the integrated circuit device dynamically organizes the internal memory prior to any memory accesses of the internal memory by the off-chip host program.

14. The integrated circuit device of claim 11, wherein the integrated circuit device dynamically organizes the internal memory during creation, invocation, or both of an OpenCL kernel.

15. An integrated circuit device, comprising:

internal memory;

an off-chip interconnect that provides access between a host computer and the integrated circuit;

an on-chip memory interconnect that provides access to the internal memory of the integrated circuit; and host allocation circuitry that:

receives a request to allocate one or more memory buffers of an off-chip host program to one or more particular physical memory banks of the internal memory the request comprising an indication of the one or more particular physical memory areas;

determines, via a heuristic algorithm, whether the request should or should not be granted for allocating the one or more memory buffers to the one or more particular physical memory areas; and binds the one or more memory buffers to the one or more particular physical memory banks according to the request when the request should be granted; and when there is not enough physical memory in the one or more particular physical memory areas to satisfy the request, the host allocation circuitry binds the one or more memory buffers to the one or more particular physical memory banks and one or more additional memory banks by striding the one or more memory buffers across the one or more particular physical memory banks and the one or more additional memory banks.

16. A tangible non-transitory computer-readable medium, comprising instructions to:

detect a subset of memory buffers of the off-chip host program that are accessed frequently;

generate a request for at least one memory buffer of an off-chip host program to be explicitly allocated to at least one particular memory bank of internal memory banks of an integrated circuit, the request comprising an indication of one or more particular physical memory areas, wherein the request is generated such that the subset of memory buffers are uniformly spread among the internal memory banks; and provide the request to the integrated circuit, enabling the integrated circuit to allocate the at least one memory buffer to the at least one particular memory bank.

17. The tangible computer-readable medium of claim 16, comprising instructions to:

detect an indication of an allocation request by a programmable logic designer created in programmable logic design software; and generate the request based upon the indication.

18. The tangible computer-readable medium of claim 17, comprising instructions to detect the indication as a flag specifying the at least one particular memory bank, wherein the flag is provided in a buffer allocation call created in the programmable logic design software.

* * * * *